(12) United States Patent
Yuan et al.

(10) Patent No.: US 10,487,940 B2
(45) Date of Patent: Nov. 26, 2019

(54) HYDRAULIC MECHANICAL TRANSMISSION WITH INCREASED EFFICIENCY

(71) Applicant: Eaton Intelligent Power Limited, Dublin (IE)

(72) Inventors: QingHui Yuan, Edina, MN (US); Matthew E. Creswick, Shakopee, MN (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 15/680,805

(22) Filed: Aug. 18, 2017

(65) Prior Publication Data

US 2018/0051803 A1    Feb. 22, 2018

Related U.S. Application Data

(60) Provisional application No. 62/377,151, filed on Aug. 19, 2016, provisional application No. 62/377,164, (Continued)

(51) Int. Cl.

| F16H 61/438 | (2010.01) |
|---|---|
| F16H 39/10 | (2006.01) |
| F16H 39/12 | (2006.01) |
| F16H 47/02 | (2006.01) |
| F16H 47/04 | (2006.01) |

(Continued)

(52) U.S. Cl.
CPC .......... *F16H 61/438* (2013.01); *F16H 39/10* (2013.01); *F16H 39/12* (2013.01); *F16H 47/02* (2013.01); *F16H 47/04* (2013.01); *F16H 47/07* (2013.01); *F16H 61/0009* (2013.01); *F16H 61/0025* (2013.01); *F16H 2037/0866* (2013.01); *F16H 2039/105* (2013.01); *F16H 2047/045* (2013.01)

(58) Field of Classification Search
CPC ............................. F16H 61/438; F16H 39/10
USPC ...................................................... 6/492, 487
See application file for complete search history.

(56) References Cited

U.S. PATENT DOCUMENTS

| 3,241,319 A | 3/1966 | Andrews |
|---|---|---|
| 3,300,000 A | 1/1967 | Stoyke |

(Continued)

FOREIGN PATENT DOCUMENTS

WO    2017031379 A1    2/2017

OTHER PUBLICATIONS

A41CT Compact Unit for Hydromechanical Power Split Gearboxes, Youtube, Mar 7, 2012. https://www.youtube.com/watch?v=T5vpql7Smlc (Year: 2012).*

*Primary Examiner* — Michael Leslie
*Assistant Examiner* — Daniel S Collins
(74) *Attorney, Agent, or Firm* — Merchant & Gould P.C.

(57) ABSTRACT

A hydraulic mechanical transmission includes a first hydraulic unit having a first shaft and a second hydraulic unit having a second shaft. The second hydraulic unit is connected in hydraulic fluid communication with the first hydraulic unit by high and low pressure lines. A mechanical torque transfer arrangement transfers torque between the first shaft of the first hydraulic unit and a rotatable housing of the second hydraulic unit. One of the first and second hydraulic units operates as a hydraulic pump and the other operates as a hydraulic motor, and both of the first and second hydraulic units have variable displacement.

17 Claims, 9 Drawing Sheets

Related U.S. Application Data filed on Aug. 19, 2016, provisional application No. 62/377,178, filed on Aug. 19, 2016.

(51) Int. Cl.
*F16H 61/00* (2006.01)
*F16H 47/07* (2006.01)
*F16H 37/08* (2006.01)

(56) References Cited

U.S. PATENT DOCUMENTS

| | | |
|---|---|---|
| 3,543,514 A | 12/1970 | Reimer |
| 3,643,433 A | 2/1972 | Widmaier |
| 4,875,390 A | 10/1989 | Hayashi et al. |
| 5,054,289 A | 10/1991 | Nagatomo |
| 5,396,768 A | 3/1995 | Zulu |
| 5,423,183 A | 6/1995 | Folsom |
| 5,486,142 A | 1/1996 | Folsom |
| 6,773,368 B1 * | 8/2004 | Williames .............. B60K 17/16 475/74 |
| 2004/0163490 A1 | 8/2004 | Nakatani et al. |
| 2005/0106958 A1 | 5/2005 | Ohtsuka |
| 2006/0120884 A1 | 6/2006 | Nozaki |
| 2010/0107626 A1 | 5/2010 | Nelson et al. |
| 2010/0205951 A1 | 8/2010 | Leker |
| 2013/0269328 A1 | 10/2013 | Iwaki et al. |
| 2014/0009126 A1 | 1/2014 | Vanderzyden et al. |
| 2014/0096515 A1 | 4/2014 | Mochizuki et al. |
| 2015/0267721 A1 | 9/2015 | Yasuda et al. |
| 2018/0051784 A1 | 2/2018 | Yuan |
| 2018/0051799 A1 | 2/2018 | Yuan |

* cited by examiner

HYDRAULIC MECHANICAL TRANSMISSION WITH INCREASED EFFICIENCY

CROSS-REFERENCE TO RELATED APPLICATIONS

This application claims priority to and the benefit of U.S. Provisional Patent Application No. 62/377,151, filed Aug. 19, 2016, entitled "Hydraulic Mechanical Transmission with Increased Efficiency"; U.S. Provisional Patent Application No. 62/377,164, filed Aug. 19, 2016, entitled "Hydraulic Mechanical Transmission with Torque Boost"; and U.S. Provisional Patent Application No. 62/377,178, filed Aug. 19, 2016, entitled "Hydraulic Mechanical Transmission"; the disclosures of which are hereby incorporated by reference herein in their entirety.

TECHNICAL FIELD

The present disclosure relates generally to transmissions. More particularly, the present disclosure relates to hydraulic mechanical transmissions.

BACKGROUND

Hydraulic mechanical transmissions (HMT), also referred to as hydro-mechanical transmissions, can be used to supply or transfer mechanical power. More conventional examples of hydraulic mechanical transmissions implement the use of planetary gear sets. However, such hydraulic mechanical transmissions are typically large in size and expensive to build, which generally limits their use to large horsepower machines.

SUMMARY

Aspects of the present disclosure relate to a hydraulic mechanical transmission that can be downsized as compared to a typical hydrostatic transmission. The reduced size can assist in reducing costs and facilitating incorporating the hydraulic mechanical transmissions into confined spaces.

Another aspect of the present disclosure relates to a hydraulic mechanical transmission with bi-directional operation without requiring switching gears. In certain examples, the hydraulic mechanical transmission can provide forward and reverse speed without requiring gears to be switched.

Another aspect of the present disclosure relates to a hydraulic mechanical transmission that can smoothly, easily, and naturally be moved in and out of neutral position.

Another aspect of the present disclosure relates to a hydraulic mechanical transmission that can be configured in a variety of different configurations easily. Example configurations include U-shaped configurations, Z-shaped configurations, or in-line configurations. Still another aspect of the present disclosure relates to a hydraulic mechanical transmission that does not use a planetary gear set.

Another aspect of the present disclosure relates to a hydraulic mechanical transmission that includes a first hydraulic unit having a first shaft, and a second hydraulic unit connected in hydraulic fluid communication with the first hydraulic unit by high and low pressure lines. The second hydraulic unit includes a second shaft and a rotating group that is coupled to the second shaft so as to rotate in unison with the second shaft about an axis defined by the second shaft. The rotating group includes a cylinder block that defines a plurality of axial cylinders, the rotating group also includes pistons mounted to slide within the axial cylinders. The second hydraulic unit further includes a rotatable housing that is rotatable relative to the second shaft about the axis of the second shaft. The rotatable housing supports a swashplate that opposes ends of the pistons. The rotatable housing includes a swashplate mount that mounts the swashplate such that the swashplate rotates in unison with the rotatable housing. The swashplate mount also allows the swashplate to pivot relative to the rotatable housing and the axis of the second shaft to vary a stroke length of the pistons within the axial cylinders such that a displacement of the rotating group can be varied. The rotatable housing also includes a commutation structure for providing fluid communication between the high and low pressure lines and the axial cylinders of the rotating group while maintaining separation between the high and low pressure lines. A mechanical torque transfer arrangement transfers torque between the first shaft of the first hydraulic unit and the rotatable housing of the second hydraulic unit. In use, one of the first and second hydraulic units operates as a hydraulic pump and the other of the first and second hydraulic units operates as a hydraulic motor, and both of the first and second hydraulic units have variable displacement.

In one example, the first hydraulic unit is a hydraulic motor and the second hydraulic unit is a hydraulic pump. In another example, the pistons reciprocate within the cylinders as the relative rotation occurs between the rotatable housing and the rotating group about the axis of the second shaft, and wherein an angle of the swashplate relative to the axis of the second shaft determines a stroke length the pistons reciprocate within the cylinders as relative rotation occurs between the rotatable housing and the rotating group about the axis of the second shaft.

In another example, the commutation structure maintains fluid communication between the high pressure line and the rotating group regardless of a rotational position of the rotatable housing about the axis defined by the second shaft, the commutation structure also maintaining fluid communication between the low pressure line and the rotating group regardless of a rotational position of the rotatable housing about the axis defined by the second shaft. The commutation structure is adapted to rotate in unison with the swashplate relative to the second shaft such that in operation a rotational position of the commutation structure about the axis of the second shaft does not change relative to the swashplate.

In another example, the commutation structure includes a first annular groove in fluid communication with the high pressure line and a second annular groove in fluid communication with the low pressure line. The commutation structure includes first porting in fluid communication with the first annular groove and second porting in fluid communication with the second annular groove. The first porting includes a first fluid exchange interface in fluid communication with a first plurality of the cylinders of the rotating group as the rotating group rotates relative to the commutation structure. The second porting including a second fluid exchange interface in fluid communication with a second plurality of the cylinders of the rotating group as the rotating group rotates relative to the commutation structure. The first fluid exchange interface being fixed in rotational alignment with a first portion of an arcuate path around the swashplate, and the second fluid exchange interface being fixed in rotational alignment with a second portion of an arcuate path around the swashplate.

In one example, the first portion of the arcuate path around the swashplate corresponds to an extension stoke of the pistons within the cylinder and the second portion of the arcuate path corresponds to a retraction stroke of the pistons within the cylinders. In another example, the first and second fluid exchange interfaces each include a generally semicircular slot. In another example, the first and second annular grooves have open sides that face in a radial direction relative to the axis to the second shaft.

In one example, the hydraulic mechanical transmission has one or more bearings between the rotatable housing and the second shaft for allowing relative rotation between the rotatable component and the second shaft about the axis of the second shaft. In one example, the second hydraulic unit includes an outer housing, and one or more bearings are provided between the rotatable housing and the outer housing for allowing relative rotation between the outer housing and the rotatable housing, and one or more bearings are provided between the shaft and the outer housing.

In one example, the first hydraulic unit includes a rotating group coupled to the first shaft so as to rotate in unison with the first shaft, the rotating group including a cylinder block defining a plurality of cylinders and pistons adapted to slide in the cylinders. The first hydraulic unit further includes a swashplate upon which shoes of the pistons ride, the swashplate being capable of being angled with respect to an axis of the first shaft with an angle of the swashplate determining a stroke length of the pistons within the cylinders. The angle of the swashplate being variable to vary the stroke length of the pistons and thus the displacement of the first hydraulic unit.

In one example, the mechanical torque transfer arrangement includes a component selected from the group consisting of a belt, a chain, a pulley and a gear. In another example, the mechanical torque transfer arrangement includes a gear arrangement including intermeshing gears. In one example, the gear arrangement includes three intermeshing gears.

In one example, the rotatable housing includes an actuator for pivoting the swashplate relative to the axis of the second shaft. The actuator includes a hydraulic cylinder. The cylinder is in fluid communication with a control communication passage including an annular groove for receiving a hydraulic control signal regardless of a rotational position of the rotatable housing about the axis of the second shaft.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the examples disclosed herein are based.

DETAILED DESCRIPTION

Figure 1:
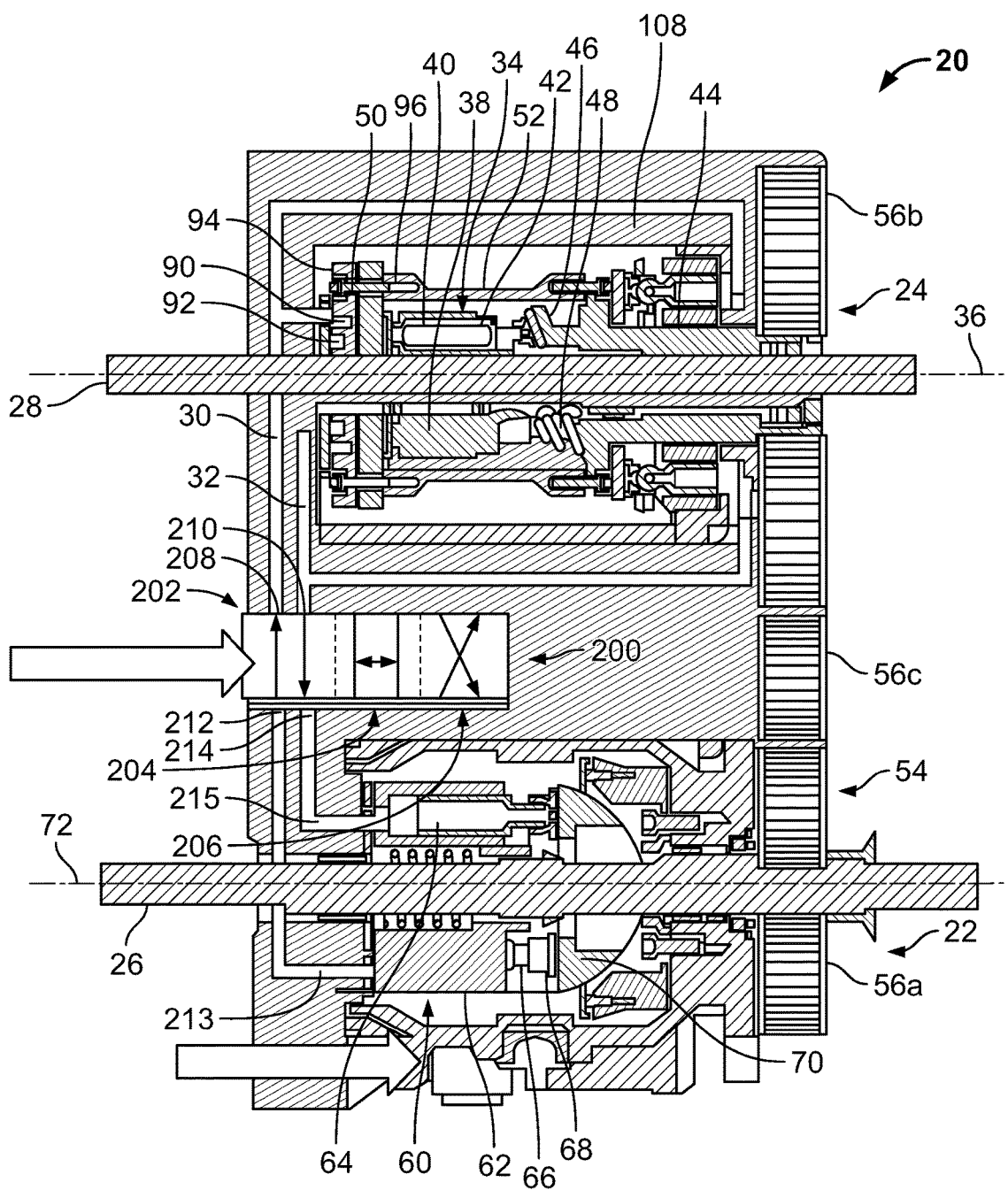
FIG. 1 is a cross-sectional view of a hydraulic mechanical transmission in accordance with the principles of the present disclosure; the transmission is shown having a U-shaped configuration and first and second hydraulic units.

FIG. 1 illustrates a hydraulic mechanical transmission 20 in accordance with the principles of the present disclosure. The hydraulic mechanical transmission 20 includes a first hydraulic unit 22 and a second hydraulic unit 24. The first hydraulic unit 22 includes a first shaft 26 and the second hydraulic unit includes a second shaft 28. The first and second hydraulic units 22, 24 are connected in hydraulic fluid communication with one another by high and low pressure lines 30, 32. A valve 200 having at least one variable orifice is positioned along the high and low pressure lines 30, 32. As used herein, the term "pressure line" includes any passage, tube, hose, conduit, port, porting, passage in a housing or other structure for carrying hydraulic fluid. Also, the terms "high pressure" and "low pressure" are intended to be relative terms simply meaning that one pressure line has higher pressure than the other.

The second hydraulic unit 24 includes a rotating group 34 that is coupled to the second shaft 28 so as to rotate in unison with the second shaft 28 about an axis 36 defined by the second shaft 28. The rotating group 34 includes a cylinder block 38 that defines a plurality of axial cylinders 40. The cylinder block 38 is connected to the second shaft 28 by a torque-transmitting connection such as a splined or keyed connection such that the cylinder block 38 as well as the remainder of the rotating group 34 rotates in unison with the second shaft 28. The rotating group 34 also includes pistons 42 mounted to slide or reciprocate within the axial cylinders 40.

The second hydraulic unit 24 further includes a rotatable component 44 including a swashplate 46 that opposes the ends of the pistons 42. The ends of the pistons 42 can include shoes 48 (shown in more detail in FIG. 6) that ride along the swashplate 46. Hydrostatic bearings can be defined between the shoes 48 and the surface of the swashplate 46. The rotatable component 44 also includes a commutation structure 50 (shown in more detail in FIGS. 2-5) for providing fluid communication between the high and low pressure lines 30, 32 and the axial cylinders 40 of the rotating group 34 while maintaining separation between the high and low pressure lines 30, 32. It will be appreciated that the commutation structure 50 can be mechanically coupled to the swashplate 46 by a coupling structure 52 such as a sleeve, rods, couplers, a housing, struts, or other structures. In this way, the commutation structure 50 is configured to rotate in unison with the swashplate 46. In certain examples, the commutation structure 50 can include porting having fluid exchange interfaces that are fixed in rotational position relative to the swashplate 46.

The hydraulic mechanical transmission 20 further includes a mechanical torque transfer arrangement 54 for transferring torque between the first shaft 26 of the first hydraulic unit 22 and the rotatable component 44 of the second hydraulic unit 24. As depicted, the mechanical torque transfer arrangement 54 includes intermeshing gears 56a-56c. Gears 56a and 56b are mounted on shafts 26, 28, respectively, and gear 56c transfers torque between gears 56a, 56b. In other examples, other gear arrangements can be utilized. Additionally, in further examples, other mechanical torque transfer arrangements such as chains, belts, pulleys and other types of gears or gear configurations can be used.

In certain examples, at least one of the first and second hydraulic units 22, 24 is configured to provide a variable displacement which can be controlled by a controller such as an electronic controller. In use of the hydraulic mechanical transmission 20, one of the first and second hydraulic units 22, 24 operates as a hydraulic pump and the other of the first and second hydraulic units 22, 24 operates as a hydraulic motor. In a preferred example, the first hydraulic unit 22 is operated as a motor and the second hydraulic unit 24 is operated as a pump.

Referring still to FIG. 1, the first hydraulic unit 22 includes a rotating group 60 coupled to the first shaft 26 so as to rotate in unison with the first shaft 26. The rotating group 60 includes a cylinder block 62 defining a plurality of axial cylinders 64. The cylinder block 62 is mechanically coupled to the first shaft 26 by a mechanical connection that rotationally fixes the cylinder block 62 to the first shaft 26 such that the cylinder block 62 and the remainder of the rotating group 60 rotate in unison with the first shaft 26. In certain examples, a mechanical connection such as a splined connection, a keyed connection, a fastened connection or other connection can be used. The rotating group 60 further includes pistons 66 adapted to slide or reciprocate in the axial cylinders 64. The pistons 66 can include piston shoes 68. The first hydraulic unit 22 further includes a swashplate 70 upon which the shoes 68 of the pistons 66 ride. Hydrostatic bearings can be provided between the piston shoes 68 and the surface of the swashplate 70.

It will be appreciated that in a rotating group such as the type disclosed herein, the axial pistons are adapted to reciprocate within their corresponding cylinders as relative rotation occurs between the swashplate and the rotating group. An angle of the swashplate relative to the axis of the shaft determines a stroke length that the pistons reciprocate within their corresponding cylinders as relative rotation occurs between the swashplate and the rotating group.

With regard to the second hydraulic unit 24, the pistons 42 reciprocate within their respective cylinders 40 as relative rotation occurs between the rotatable component 44 and the rotating group 34 about the axis 36 of the second shaft 28. The angle of the swashplate 46 determines the stroke length that the pistons 42 reciprocate within their corresponding cylinders 40. With regard to the second hydraulic unit 24, the swashplate 46 has a fixed angle relative to the axis 36. Thus, the second hydraulic unit 24 has a fixed displacement since the angle of the swashplate 46 cannot be adjusted to adjust the stroke length of the pistons 42.

In contrast, the swashplate 70 of the first hydraulic unit 22 can be positioned at different angles relative to the first shaft 26 so as to adjust the displacement of the first hydraulic unit 22. When the swashplate 70 is set at a neutral position that is generally perpendicular relative to an axis 72 of the first shaft 26, the first hydraulic unit 22 generally has zero displacement. The swashplate 70 can be pivoted in a forward direction (e.g., clockwise as shown at FIG. 1) from the neutral pivot orientation to a forward angled position such that the piston stroke length and thus the displacement of the first hydraulic unit 22 increases. The more forward the swashplate 70 is pivoted, the greater displacement of the pistons 66. The swashplate 70 can also be pivoted in a negative direction from the neutral orientation (e.g., counter-clockwise as shown at FIG. 1) to a reverse angled position.

For a rotating group of the type described herein, when relative rotation occurs between the rotating group and its corresponding swashplate, the shoes of the pistons travel or ride along an arcuate path around the swashplate as the relative rotation occurs. For generally half of the arcuate path around the swashplate, the pistons extend along an extension stroke. Along the remaining half of the arcuate path around the swashplate, the pistons retract along a retraction stroke. It will be appreciated that the arcuate path corresponding to the extension stroke extends generally from a point of the swashplate closest to the rotating group to a point of the swashplate farthest from the rotating group. Also, the part of the arcuate path point corresponding to the retraction stroke extends from the part of the swashplate farthest from the rotating group to the part of the swashplate closest to the rotating group.

Figure 6:
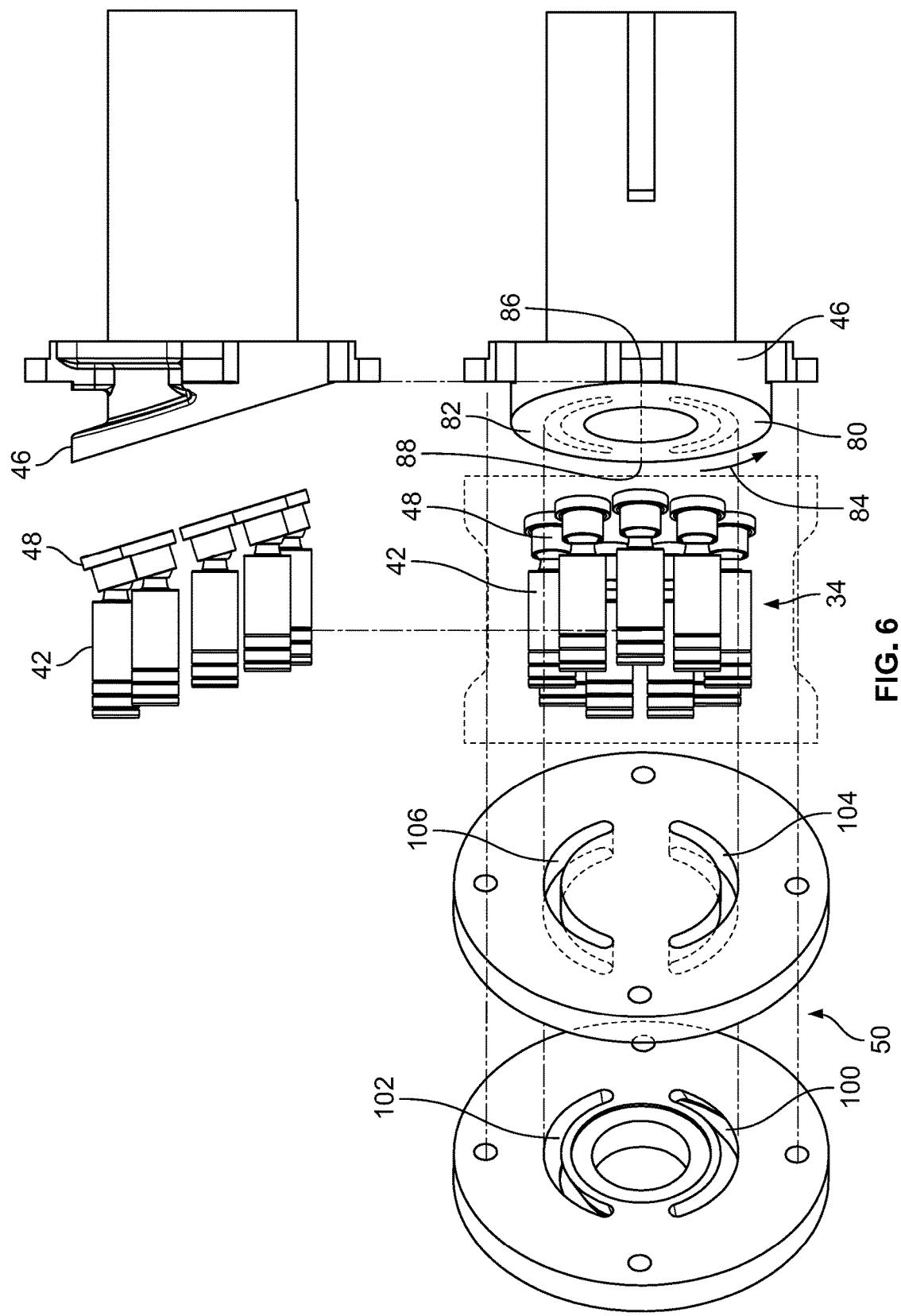
FIG. 6 is a diagrammatic view showing how the commutation structure of the hydraulic mechanical transmission of FIG. 1 is rotationally oriented relative to a swashplate of the second hydraulic unit of FIG. 1; inlet and outlet ports (i.e., fluid exchange interfaces) of the commutation structure have been superimposed on the piston supporting surface of the swashplate to schematically show the relative positioning of the inlet and outlet porting relative to the swashplate.

FIG. 6 is a diagrammatic view of the second hydraulic unit showing a top view (at the top of the figure) of the swashplate 46 orientated with respect to the pistons 42 of the rotating group 34, and a side view (at the bottom of the figure) of the swashplate 46 orientated with respect to the pistons 42 of the rotating group 34 and the commutation structure 50. As shown at FIG. 6, the swashplate 46 includes a first semicircle section 80 and a second semicircle section 82. Assuming the rotating group 34 rotates in a direction 84 relative to the swashplate 46, section 80 of the swashplate 46 corresponds to an extension stroke of the pistons 42 and section 82 corresponds to a retraction stroke of the pistons 42. Point 86 of the swashplate 46 is farthest from the rotating group 34 and point 88 of the swashplate is closest to the rotating group 34.

The commutation structure 50 of the second hydraulic unit 24 maintains constant fluid communication between the high pressure line 30 and the rotating group 34 regardless of a rotational position of the rotatable component 44 about the axis 36 of the second shaft 28. The commutation structure 50 also maintains fluid communication between the low pressure line 32 and the rotating group 34 regardless of a rotational position of the rotatable component 44 about the axis 36 of the second shaft 28. The commutation structure 50 is adapted to rotate in unison with the swashplate 46 relative to the second shaft 28 such that in operation a rotational position of the commutation structure 50 about the axis 36 of the second shaft 28 does not change relative to the swashplate 46. As shown at FIG. 1, the commutation structure 50 can include a first annular groove 90 in fluid communication with the high pressure line 30 and a second annular groove 92 in fluid communication with the low pressure line 32. Since the grooves 90, 92 are annular (as shown in more detail in FIG. 3) and are centered about the axis 36, the annular grooves 90, 92 maintain in constant communication with their respective pressure lines 30, 32 regardless of the rotational position of the rotatable component 44 about the axis 36. It will be appreciated that the annular grooves 90, 92 have open sides that face in an axial direction relative to the axis 36 of the second shaft 28 (as will be described in more detail with regard to FIGS. 2-5).

Figure 2:
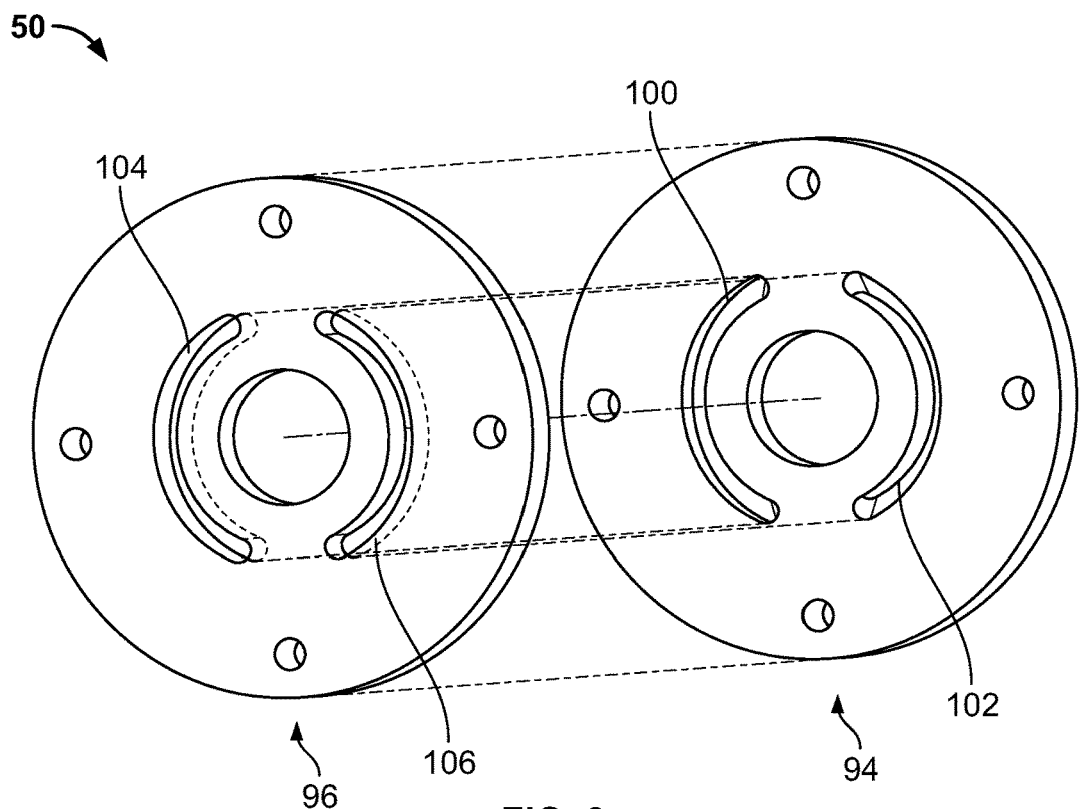
FIG. 2 is an exploded view of an example commutation structure that can be utilized by the hydraulic mechanical transmission of FIG. 1.
Figure 3:
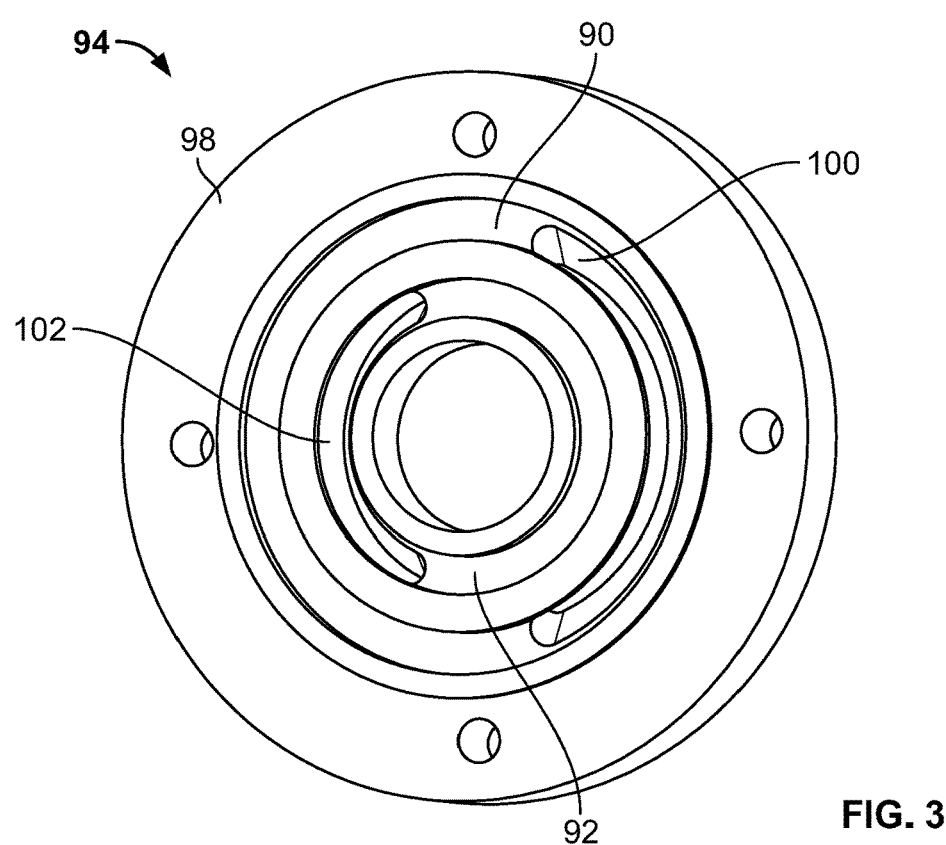
FIG. 3 shows a first side of a first valve plate of the commutation structure of FIG. 2.
Figure 4:
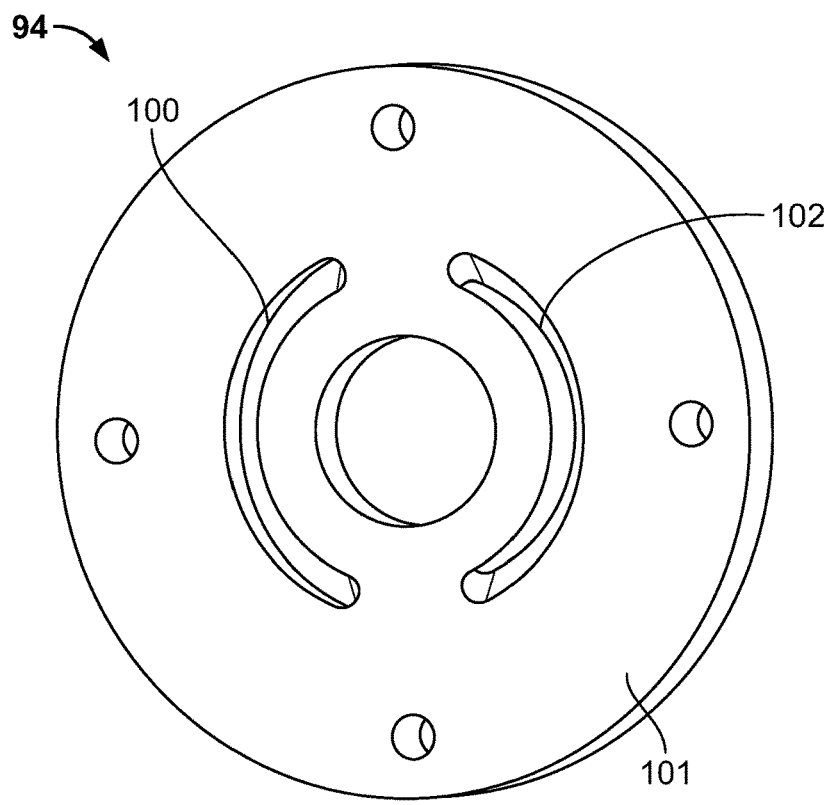
FIG. 4 shows a second, opposite side of the valve plate of FIG. 3.
Figure 5:
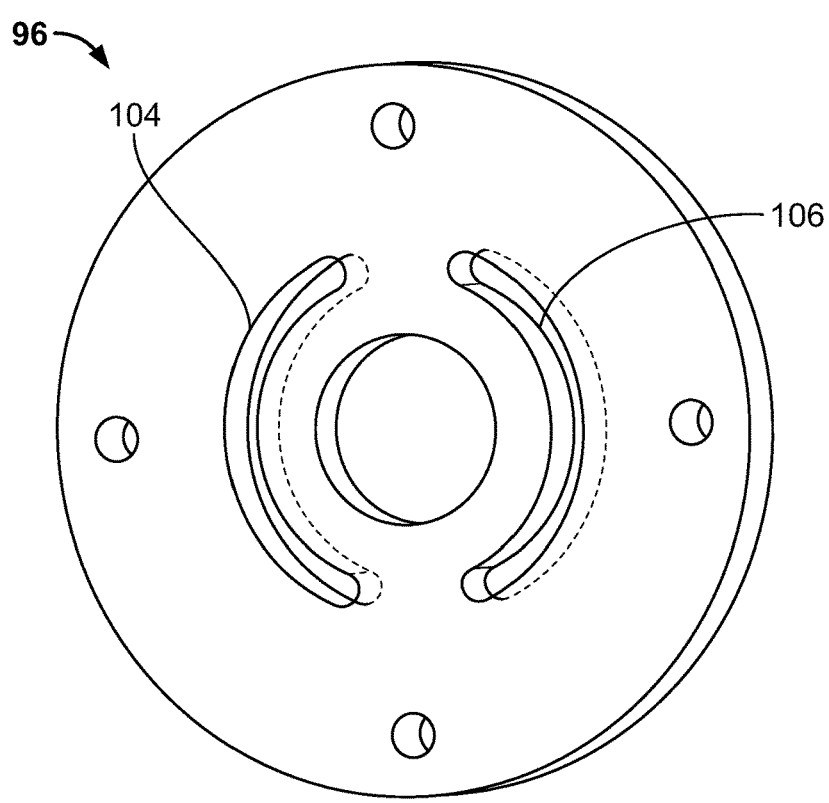
FIG. 5 shows a second valve plate of the commutation structure of the hydraulic mechanical transmission of FIG. 1.

FIGS. 2-5 schematically show the commutation structure 50. In certain examples, the commutation structure 50 can include one or more valve plates, or other structures. As shown at FIGS. 1 and 2, the commutation structure 50 includes two plates 94, 96. Plate 94 includes a first side 98 (see FIG. 3) in which the annular grooves 90, 92 are defined. Passage 100 extends from the annular groove 90 to an opposite second side 101 (see FIG. 4) of the plate 94. Passage 102 extends from the annular groove 92 to the second side 101 of the plate 94. The passages 100, 102 respectively align with curved slots 104, 106 defined through the second plate 96 (see FIG. 5). It will be appreciated that terms such as slots, grooves, passages, and like terms can also be referred to as porting. It will also be appreciated that the slots 104, 106 can be referred to as fluid exchange interfaces since such structures function to exchange fluid between the commutation structure 50 and the rotating group 34.

As shown at FIG. 6, slot 104 is fixed in rotational alignment with the first semicircle section 80 of the swashplate 46 and the slot 106 is fixed in rotational alignment with the second semicircle section 82 of the swashplate 46. Thus, in the case where the second hydraulic unit 24 is a pump, slot 104 corresponds to the high pressure line 30 and inlets hydraulic fluid to the cylinders 40 of the rotating group 34, and slot 106 couples to the low pressure line 32 and outlets hydraulic fluid from the cylinders 40 of the rotating group 34. In operation, high pressure from the high pressure line 30 forces the pistons 42 to extend as the pistons 42 slide along the section 80 of the swashplate 46. In contrast, as the pistons 42 slide along the section 82 of the swashplate 46 the pistons 42 are forced to retract. The retraction of the pistons 42 causes fluid to be outputted through the slot 106 to the low pressure line 32.

Figure 7:
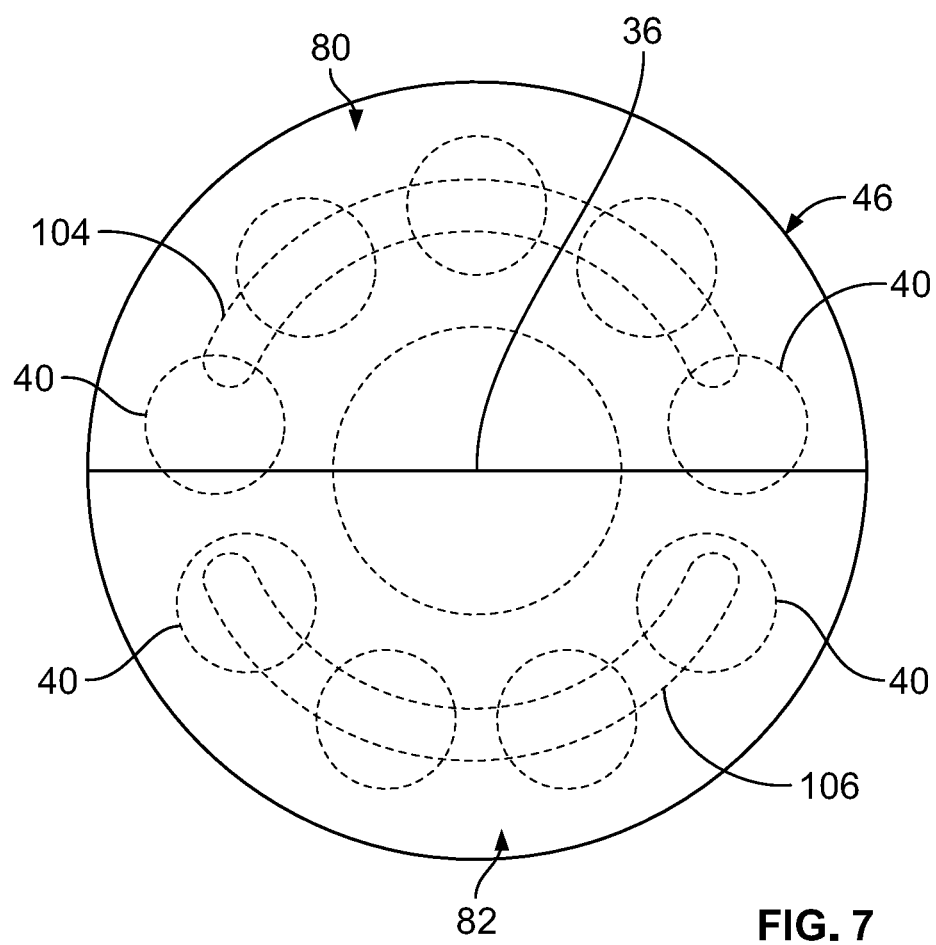
FIG. 7 is a diagrammatic view showing how the inlet and outlet porting of the commutation structure is positioned relative to cylinders of a rotating group of the hydraulic mechanical transmission of FIG. 1 at a particular point in time; it will be appreciated that the positioning of the cylinders with respect to the inlet and outlet porting will vary over time as the relative rotation occurs between the rotating group and the commutation structure.

FIG. 7 diagrammatically shows positioning of the cylinders 40 relative to the slots 104, 106 of the commutation structure 50. At any given time, a first plurality of the axial cylinders 40 will be in fluid communication with slot 104 and a second plurality of cylinders 40 will be in fluid communication with the slot 106. As shown at FIG. 7, for illustration purposes, dash lines representing the positioning of the cylinders 40 and the slots 104, 106 have been superimposed on the surface of the swashplate 46. As relative rotation occurs between the rotatable component 44 and the rotating group 34, the cylinders 40 rotate relative to the commutation structure 50. Thus, each time the rotating group 34 makes one rotation relative to the commutation structure 50, each of the cylinders 40 is in in fluid communication with the slot 104 for about half the time and is in fluid communication with the slot 106 for about the remaining half of the time.

In certain examples, the rotatable component 44 is rotatable relative to the second shaft 28 and also relative to a housing 108 of the second hydraulic unit 24. One or more bearings can be provided between the second shaft 28 and the rotatable component 44. Additionally, bearings can be provided between the rotatable component 44 and the housing 108, and can also be provided between the shaft 28 and the housing 108. Some non-limiting examples of bearings that can be used include roller bearings, hydrostatic bearings, bushings, or other structures/types of bearings.

Figure 8:
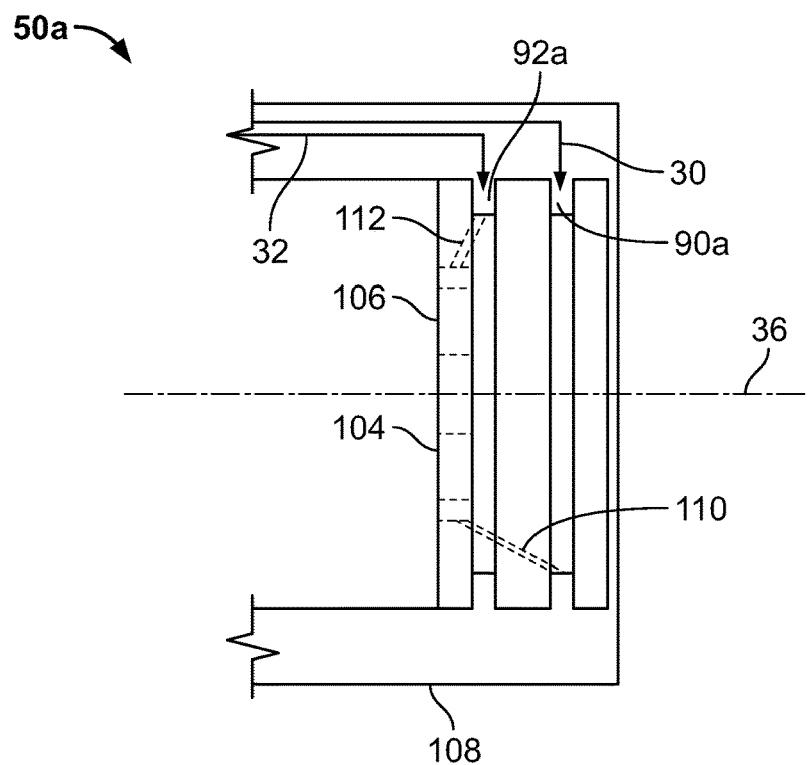
FIG. 8 is a side view of another commutation structure that can be used with the hydraulic mechanical transmission of FIG. 1.
Figure 9:
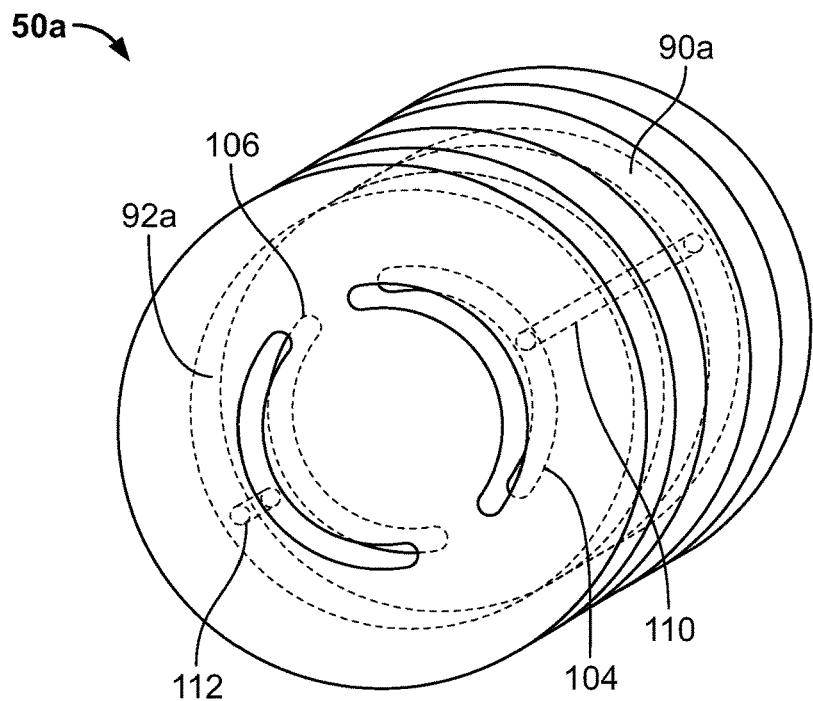
FIG. 9 is a perspective view of the commutation structure of FIG. 8.

FIGS. 8 and 9 show an alternative commutation structure 50a having annular grooves 90a, 92a having open sides that face radially outwardly from the axis 36. High and low pressure lines 30, 32 are shown defined through the housing and are in fluid communication with the groove 90a, 92a. Groove 90a is connected to slot 104 by port or ports 110 and groove 92a is connected to slot 106 by port or ports 112.

The valve 200 can be a type of valve having a metering member or other structure capable of providing an orifice that can be varied in size. By varying the size of the orifice, the flow through the orifice can be controlled. In certain examples, the metering member is electronically controlled by a controller that also interfaces with the variable displacement first hydraulic unit 22. In this way, through cooperatively controlling the size of the orifice as well as the displacement of the first hydraulic unit 22, the speed and torque output from the hydro-mechanical transmission 20 can be readily controlled. In certain examples, the valve 200 can include a proportional valve having a solenoid that controls the position of a spool or other type of metering member based on an electronic control signal. The movement of the metering member can be proportional to the magnitude of the electronic signal. In certain examples, the valve 200 can include one solenoid or opposing solenoids to control the position of the metering member. In certain examples, the valve 200 can be a directional proportional valve having one position where flow is routed in a first direction through the first hydraulic unit 22 and a second position where flow is routed in a second opposite direction through the first hydraulic unit 22.

In the depicted example of FIG. 1, the valve 200 is a three-position proportional valve having a forward flow position 202, a neutral position 204, and a reverse flow position 206. The valve 200 includes a high pressure port 208 in fluid communication with a high pressure side of the second hydraulic unit 24 and a low pressure port 210 in fluid communication with a low pressure side of the second hydraulic unit 24. The variable orifice valve 200 also includes a first motor port 212 in fluid communication with a first valve plate port 213 for exchanging fluid with the rotating group 60 and a second motor port 214 in fluid communication with a second valve plate port 215 for exchanging fluid with the rotating group 60 of the first hydraulic unit 22.

When the valve 200 is in the forward flow position 202, the high pressure port 208 is in fluid communication with the first motor port 212 and the low pressure port 210 is in fluid communication with the second motor port 214. In this configuration, the high pressure line 30 is coupled to the first valve plate port 213 and the low pressure line 32 is coupled to the second valve plate port 215 such that pressurized hydraulic fluid from the second hydraulic unit 24 drives the rotating group 60 of the first hydraulic unit 22 in a forward rotational direction about the axis 72.

In contrast, when the valve 200 is in the reverse flow position 206, the high pressure port 208 is in fluid communication with the second motor port 214 and the low pressure port 210 is in fluid communication with the first motor port 212. In this configuration, the high pressure line 30 is coupled to the second valve plate port 215 and the low pressure line 32 is coupled to the first valve plate port 213 such that pressurized hydraulic fluid from the second hydraulic unit 24 drives the rotating group 60 in a reverse direction about the axis 72.

In the neutral position 204, the valve 200 is in an open configuration in which the variable orifice valve 200 connects the high pressure line 30 to the low pressure line 32. In this configuration, hydraulic fluid circulates through the valve 200 from the high pressure port 208 to the low pressure port 210 such that the hydraulic fluid basically circulates through the second hydraulic unit 24 and bypasses the first hydraulic unit 22.

Between the neutral position 204 and the forward flow position 202, the valve 200 provides metered flow in which the size of the orifice gradually opens as the valve metering member moves from the neutral position 204 toward the forward flow position 202. In certain examples, the orifice is fully opened at the forward flow position 202. Between the neutral position 204 and the reverse flow position 206, the orifice of the valve 200 gradually opens as the metering member of the valve 200 gradually moves from the neutral position 204 toward the reverse flow position 206.

It will be appreciated that the amount of flow provided to the first and second motor ports 212, 214 through the valve 200 is proportional to the size of the orifice. When the orifice is relatively small, only a small amount of flow is provided for driving the rotating group 60 of the first hydraulic unit 22 while the remainder of the flow is re-circulated back to the second hydraulic unit 24. When the valve 200 is metering flow to the first hydraulic unit 22, the speed at which the rotating group 60 of the first hydraulic unit 22 is driven is proportional to the size of the orifice providing flow to the first hydraulic unit 22. Positioning of the valve 200 and positioning of the swashplate 70 of the first hydraulic unit 22 can be controlled and coordinated by a control unit. The control unit can control the position and orifice size of the valve 200 utilizing a solenoid or other structure. A hydraulic signal, hydraulic cylinder, solenoid or other structure can be used to control the position of the swashplate 70 of the first hydraulic unit 22.

During initial startup, the valve 200 can be set in the neutral position 204. If it is desired to move forward, the swashplate 70 can be pivoted to the full forward angled position providing maximum displacement. Next, the valve 200 is moved gradually from the neutral position 204 toward the forward flow position 202 to gradually increase flow to the rotating group 60 and gradually increase the rotation speed of the first shaft 26 in the forward direction (once the initial load on the shaft 26 has been overcome). Once the valve 200 is in the full forward flow position 202, the speed of the first shaft 26 can be further increased by pivoting the swashplate 70 to reduce displacement. If increased torque and lower speeds are needed, the swashplate 70 can move back to the full displacement position. If a further torque boost is needed, the size of the orifice of the valve 200 can be restricted such that reduced flow is provided to the rotating group 60. Similarly, to slow down in the forward mode, the valve 200 is moved gradually from the forward flow position 202 to the neutral position 204. It will be appreciated that torque is boosted as the flow is reduced.

To drive rotation in a reverse direction, the valve 200 is initially set in the neutral position 204 and the swashplate 70 of the first hydraulic unit 22 is again positioned at maximum forward displacement. The valve 200 is then gradually moved from the neutral position 204 toward the reverse flow position 206 to increase the pressurized flow provided to the rotating group 60 of the first hydraulic unit 22. Once the pressure is high enough to overcome the initial load on the shaft 26, the shaft 26 begins to rotate in the reverse direction. The reverse rotational speed increases as the valve 200 continues to be moved toward the reverse flow position 206.

To further increase the speed of rotation of the first shaft 26 in the reverse direction, the displacement of the first hydraulic unit 22 can be reduced by reducing the angle of the swashplate 70. To slow down the rotation of the first shaft 26 in the reverse direction, the swashplate 70 is returned to the maximum displacement position. To further slow rotation of the first shaft 26 in the reverse direction, the valve 200 is moved from the reverse flow position 206 gradually back towards the neutral position 204. It will be appreciated that torque is boosted as the flow is reduced.

Figure 10:
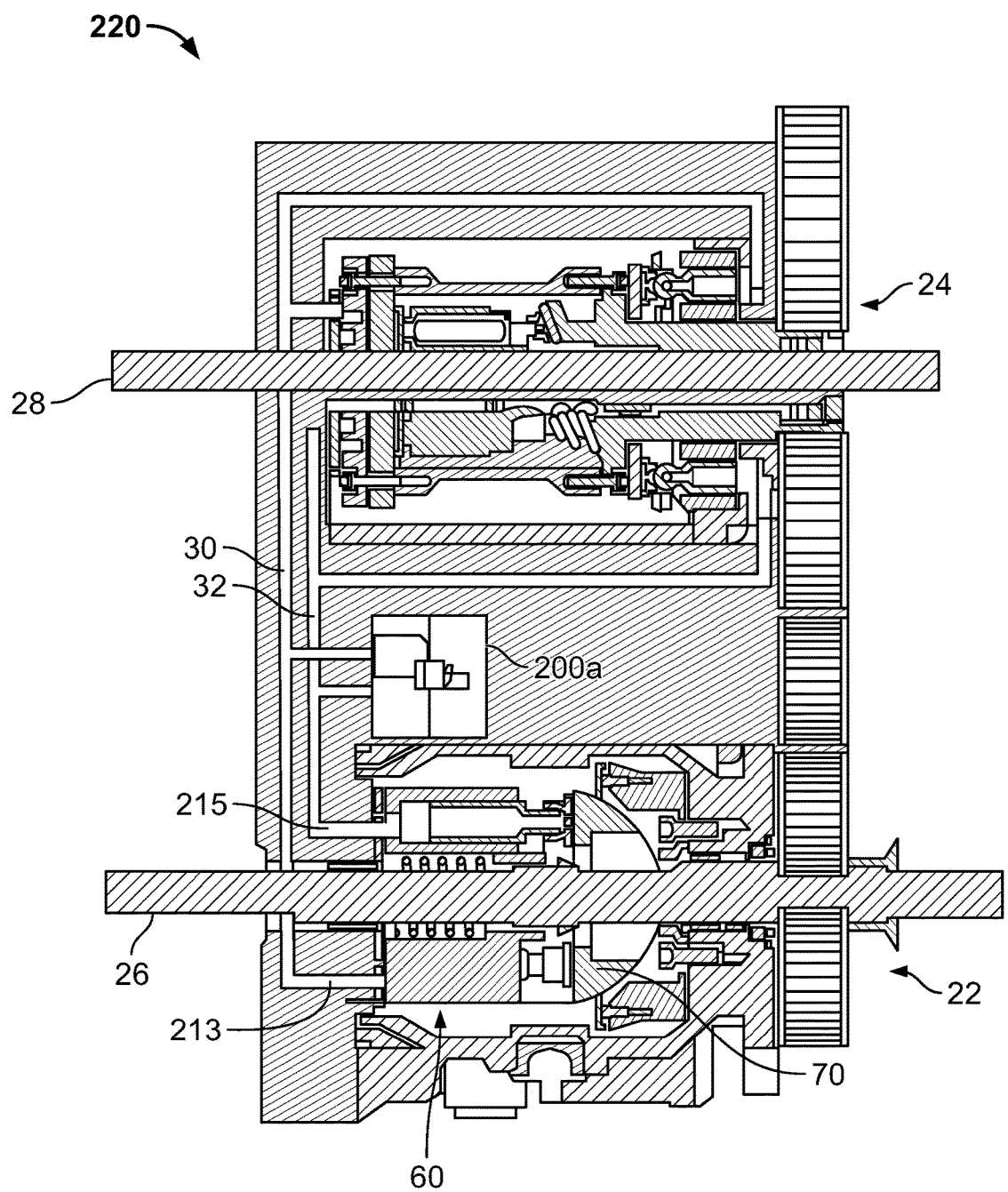
FIG. 10 shows another hydraulic mechanical transmission in accordance with the principles of the present disclosure.

FIG. 10 shows another hydraulic mechanical transmission 220 in accordance with the principles of the present disclosure where the valve 200 has been replaced with a valve 200a in the form of a relief or bypass valve. In a neutral position, the valve 200a bypasses all flow from the high pressure side of the second hydraulic unit 24 back to the low pressure side of the second hydraulic unit 24. In this way, the first hydraulic unit 22 is bypassed. Basically, when open, the valve 200a connects the high pressure line 30 to the low pressure line 32. By gradually closing the valve 200a, the bypass is steadily closed thereby causing high pressure fluid from the high pressure line 30 to be directed to the first valve plate port 213 and also causing the second valve plate port 215 to be coupled to the low pressure line 32. Thus, pressurized hydraulic fluid from the second hydraulic unit 24 is made available for driving the rotating group 60 of the first hydraulic unit 22.

In operation, the valve 200a is set to a neutral position in which it provides full bypass. To drive the first shaft 26 in a forward direction, the swashplate 70 is moved to a full forward angled position to provide maximum displacement and the valve 200a is gradually closed to increase flow to the first hydraulic unit 22. Once the pressure is sufficient to overcome the load on the first shaft 26, the shaft begins to rotate in the forward direction. The rotational speed of the first shaft 26 increases in the forward direction until the valve 200a is fully closed. Then, the speed can be further increased by moving the swashplate 70 to decrease the displacement. To slow-down rotation of the first shaft 26 in the forward direction, the swashplate 70 is moved to full displacement. Then, to further slow-down rotation of the first shaft 26 in the forward direction, the valve 200a is gradually opened.

To drive the first shaft 26 in a reverse rotational direction, the swashplate 70 is initially moved to a full displacement orientation in the negative direction. Then, the valve 200a is gradually closed to gradually provide increased pressurized flow to the rotating group 60 of the first hydraulic unit 22. Once the pressure overcomes the load on the first shaft 26, the first shaft 26 begins to rotate in the reverse direction. The speed of rotation in the reduced direction can increase as the valve 200a further closes. By moving the swashplate 70 to reduce the displacement of the rotating group 60, the speed of rotation of the first shaft 26 in the reverse direction can be further increased. To slow down rotation of the first shaft 26 in the reverse direction, the swashplate 70 can be returned back toward the negative angle corresponding to maximum displacement. Thereafter, the valve 200a can be gradually opened to gradually reduce the pressurized flow provided to the rotating group 60 of the first hydraulic unit 22.

Figure 11:
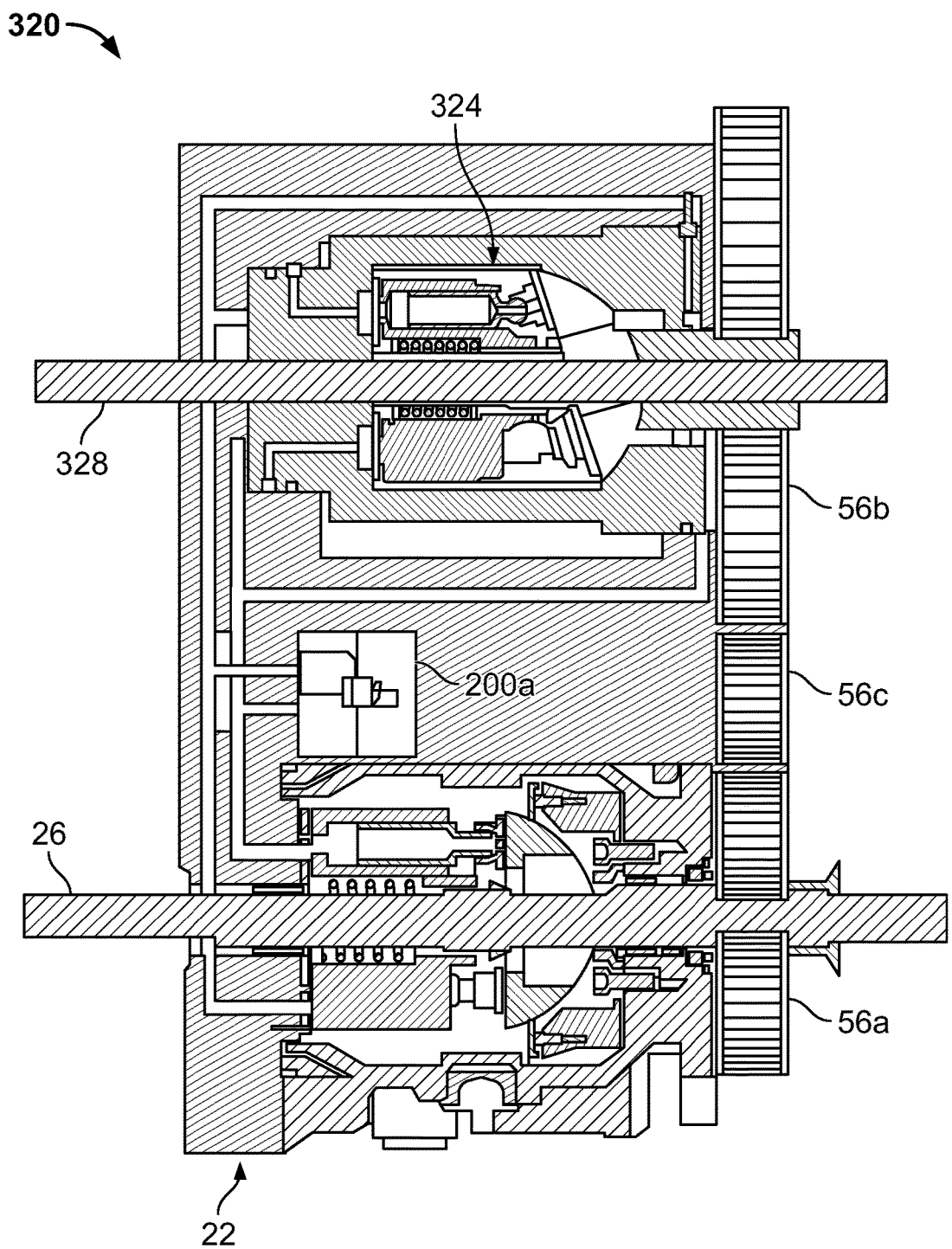
FIGS. 11 and 12 show a further hydraulic mechanical transmission in accordance with the principles of the present disclosure.
Figure 12:
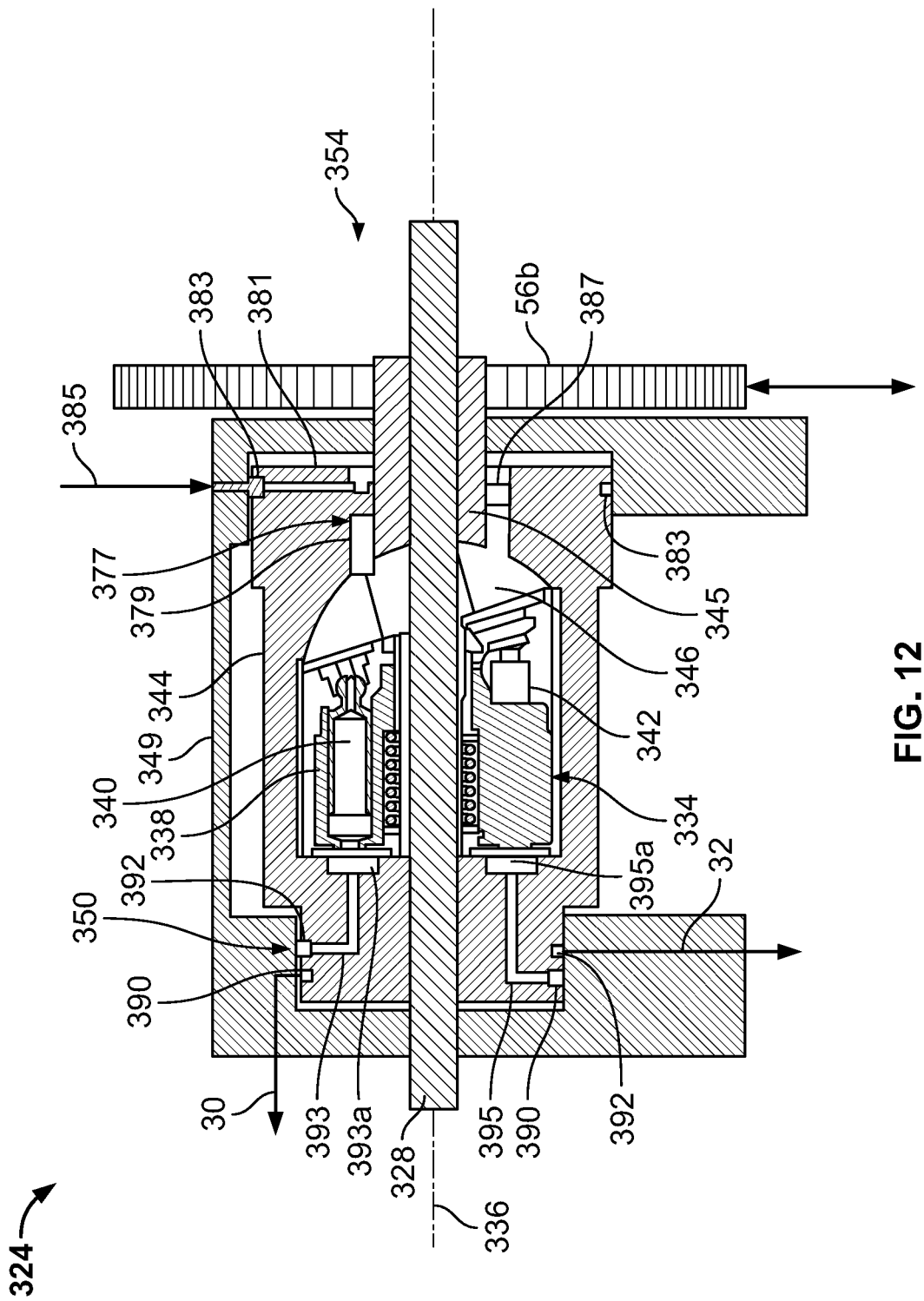

FIGS. 11 and 12 depict another hydraulic mechanical transmission 320 in accordance with the principles of the present disclosure. The hydraulic mechanical transmission 320 has the same configuration as the hydraulic mechanical transmission 220 of FIG. 10 except the second hydraulic unit 24 has been replaced with a second hydraulic unit 324 that is capable of providing variable displacement to enhance the efficiency of the system. By coordinating the variable displacement that can be provided by both the first hydraulic unit 22 and the second hydraulic unit 324 with an electronic controller, more efficient operation can be achieved. In certain examples, by providing variable displacement capability at both hydraulic units 22, 324 of the hydraulic mechanical transmission 320, the intermediate valve (e.g., valve 200 or 200a) can be eliminated.

Referring to FIG. 12, the second hydraulic unit 324 includes a shaft 328 and a rotating group 334 coupled to the shaft 328 so as to rotate in unison with the shaft 328 about an axis 336 defined by the shaft 328. The rotating group 334 includes a cylinder block 338 that defines a plurality of axial cylinders 340. The rotating group 334 also includes pistons 342 mounted to slide within the axial cylinders 340.

The second hydraulic unit 324 further includes a rotatable housing 344 that is rotatable relative to the shaft 328 about the axis 336 of the shaft 328. The rotatable housing 344 supports a swashplate 346 that opposes ends of the pistons 342. The rotatable housing 344 includes a swashplate mount 345 that mounts the swashplate 346 in such a manner that the swashplate 346 rotates in unison with the rotatable housing 344 and the swashplate 346 rotates relative to the shaft 328 (and also relative to an outer housing 349). The swashplate mount 345 also allows the swashplate 346 to pivot relative to the rotatable housing 344 and the axis 336 of the shaft 328. By pivoting the swashplate 346 relative to the axis 336 of the shaft 328, a stroke length of the pistons 342 within the axial cylinders 340 can be varied such that a displacement of the rotating group 334 is varied.

The rotatable housing 344 also includes a commutation structure 350 for providing fluid communication between the high and low pressure lines 30, 32 and the axial cylinders 340 of the rotating group 334 while maintaining separation between the high and low pressure lines 30, 32. A mechanical torque transfer arrangement 354 (e.g., gears 56a-56c) is provided for directly transferring torque between the first shaft 26 of the first hydraulic unit 22 and the rotatable housing 344 of the second hydraulic unit 324. Gear 56b is mounted on an extension of the rotatable housing 344. Bearings can be provided between the rotatable housing 344 and the shaft 328. Bearings can also be provided between the rotatable housing 344 and the outer housing 349.

The commutation structure 350 maintains fluid communication between the high pressure line 30 and the rotating group 334 regardless of a rotational position of the rotatable housing 344 about the axis 336 defined by the shaft 328. The commutation structure 350 also maintaining fluid communication between the low pressure line 32 and the rotating group 334 regardless of a rotational position of the rotatable housing 344 about the axis 336 defined by the shaft 328. The commutation structure 350 is adapted to rotate in unison with the swashplate 346 and relative to the shaft 328 such that in operation a rotational position of the commutation structure 350 about the axis 336 of the shaft 328 does not change relative to the swashplate 346.

The commutation structure 350 includes a first annular groove 390 in fluid communication with the high pressure line 30 and a second annular groove 392 in fluid communication with the low pressure line 32. The commutation structure 350 includes first porting 393 in fluid communication with the first annular groove 390 and second porting 395 in fluid communication with the second annular groove 392. The first porting 393 includes a first fluid exchange interface 393a in fluid communication with a first plurality of the cylinders of the rotating group 334 as the rotating group 334 rotates relative to the commutation structure 350. The second porting 395 includes a second fluid exchange interface 395a in fluid communication with a second plurality of the cylinders of the rotating group 334 as the rotating group rotates relative to the commutation structure 350. The first and second fluid exchange interfaces 393a, 395a are fixed in rotational alignment with a piston extension and piston retraction portions, respectively, of the swashplate 346.

The rotatable housing 344 includes an actuator 377 for pivoting the swashplate 346 relative to the axis 336 of the shaft 328. The actuator 377 includes a hydraulic arrangement 379. In certain examples, the hydraulic arrangement 379 includes a piston and cylinder arrangement. The hydraulic arrangement 379 is in fluid communication with a control communication passage 381 including an annular groove 383 for receiving a hydraulic control signal 385 regardless of a rotational position of the rotatable housing 344 about the axis 336 of the shaft 328. The hydraulic control signal 385 includes a control pressure that can be varied by an electronic controller to control a pivot/displacement position of the swashplate 346. In certain examples, a spring 387 can be provided on an opposite side of the shaft 328 from the hydraulic arrangement 379 for biasing the swashplate 346 toward a neutral position. In certain examples, another hydraulic arrangement 379 can be substituted for the spring 387 to provide active control for pivoting the swashplate 346 in both directions.

The various embodiments described above are provided by way of illustration only and should not be construed to limit the claims attached hereto. Those skilled in the art will readily recognize various modifications and changes that may be made without following the example embodiments illustrated and described herein, and without departing from the true spirit and scope of the following claims.

What is claimed is:

1. A hydraulic mechanical transmission comprising:
a first hydraulic unit having a first shaft;
a second hydraulic unit connected in hydraulic fluid communication with the first hydraulic unit by high and low pressure lines, the second hydraulic unit including a second shaft and a rotating group that is coupled to the second shaft so as to rotate in unison with the second shaft about an axis defined by the second shaft, the rotating group including a cylinder block that defines a plurality of axial cylinders, the rotating group also including pistons mounted to slide within the axial cylinders, the second hydraulic unit further including a rotatable housing that is rotatable relative to the second shaft about the axis of the second shaft, the rotatable housing supporting a swashplate that opposes ends of the pistons, the rotatable housing including a swashplate mount that mounts the swashplate such that the swashplate rotates in unison with the rotatable housing, the swashplate mount also allows the swashplate to pivot relative to the rotatable housing and the axis of the second shaft to vary a stroke length of the pistons within the axial cylinders such that a displacement of the rotating group can be varied, the rotatable housing also including a commutation structure for providing fluid communication between the high and low pressure lines and the axial cylinders of the rotating group while maintaining separation between the high and low pressure lines;
a mechanical torque transfer arrangement for transferring torque between the first shaft of the first hydraulic unit and the rotatable housing of the second hydraulic unit; and wherein in use one of the first and second hydraulic units operates as a hydraulic pump and the other of the first and second hydraulic units operates as a hydraulic motor, and wherein both of the first and second hydraulic units have variable displacement.

2. The hydraulic mechanical transmission of claim 1, wherein the first hydraulic unit is a hydraulic motor and the second hydraulic unit is a hydraulic pump.

3. The hydraulic mechanical transmission of claim 2, wherein the pistons reciprocate within the cylinders as the relative rotation occurs between the rotatable housing and the rotating group about the axis of the second shaft, and wherein an angle of the swashplate relative to the axis of the second shaft determines a stroke length the pistons reciprocate within the cylinders as relative rotation occurs between the rotatable housing and the rotating group about the axis of the second shaft.

4. The hydraulic mechanical transmission of claim 3, wherein the commutation structure maintains fluid communication between the high pressure line and the rotating group regardless of a rotational position of the rotatable housing about the axis defined by the second shaft, the commutation structure also maintaining fluid communication between the low pressure line and the rotating group regardless of a rotational position of the rotatable housing about the axis defined by the second shaft, and wherein the commutation structure is adapted to rotate in unison with the swashplate relative to the second shaft such that in operation a rotational position of the commutation structure about the axis of the second shaft does not change relative to the swashplate.

5. The hydraulic mechanical transmission of claim 4, wherein the commutation structure includes a first annular groove in fluid communication with the high pressure line and a second annular groove in fluid communication with the low pressure line, wherein the commutation structure includes first porting in fluid communication with the first annular groove and second porting in fluid communication with the second annular groove, the first porting including a first fluid exchange interface in fluid communication with a first plurality of the cylinders of the rotating group as the rotating group rotates relative to the commutation structure, the second porting including a second fluid exchange interface in fluid communication with a second plurality of the cylinders of the rotating group as the rotating group rotates relative to the commutation structure, the first fluid exchange interface being fixed in rotational alignment with a first portion of an arcuate path around the swashplate, and wherein the second fluid exchange interface being fixed in rotational alignment with a second portion of an arcuate path around the swashplate.

6. The hydraulic mechanical transmission of claim 5, wherein the first portion of the arcuate path around the swashplate corresponds to an extension stoke of the pistons within the cylinder and the second portion of the arcuate path corresponds to a retraction stroke of the pistons within the cylinders.

7. The hydraulic mechanical transmission of claim 6, wherein the first and second fluid exchange interfaces each include a generally semi-circular slot.

8. The hydraulic mechanical transmission of claim 7, wherein the first and second annular grooves have open sides that face in a radial direction relative to the axis to the second shaft.

9. The hydraulic mechanical transmission of claim 1, further comprising one or more bearings between the rotatable housing and the second shaft for allowing relative rotation between the rotatable component and the second shaft about the axis of the second shaft.

10. The hydraulic mechanical transmission of claim 9, wherein the second hydraulic unit includes an outer housing, and wherein one or more bearings are provided between the rotatable housing and the outer housing for allowing relative rotation between the outer housing and the rotatable housing, and wherein one or more bearings are provided between the shaft and the outer housing.

11. The hydraulic mechanical transmission of claim 1, wherein the first hydraulic unit includes a rotating group coupled to the first shaft so as to rotate in unison with the first shaft, the rotating group including a cylinder block defining a plurality of cylinders and pistons adapted to slide in the cylinders, the first hydraulic unit further including a swashplate upon which shoes of the pistons ride, the swashplate being capable of being angled with respect to an axis of the first shaft with an angle of the swashplate determining a stroke length of the pistons within the cylinders, the angle of the swashplate being variable to vary the stroke length of the pistons and thus the displacement of the first hydraulic unit.

12. The hydraulic mechanical transmission of claim 1, wherein the mechanical torque transfer arrangement includes a component selected from the group consisting of a belt, a chain, a pulley and a gear.

13. The hydraulic mechanical transmission of claim 1, wherein the mechanical torque transfer arrangement includes a gear arrangement including intermeshing gears.

14. The hydraulic mechanical transmission of claim 1, wherein the hydraulic mechanical transmission can be arranged in a U or Z shaped configuration.

15. The hydraulic mechanical transmission of claim 14, wherein the gear arrangement includes three intermeshing gears.

16. The hydraulic mechanical transmission of claim 1, wherein the hydraulic mechanical transmission does not include a planetary gear set.

17. The hydraulic mechanical transmission of claim 1, wherein the rotatable housing includes an actuator for pivoting the swashplate relative to the axis of the second shaft, the actuator including a hydraulic cylinder, and the cylinder being in fluid communication with a control communication passage including an annular groove for receiving a hydraulic control signal regardless of a rotational position of the rotatable housing about the axis of the second shaft.

* * * * *